J. E. VAN DEVENTER & L. SWANK.
ADJUSTABLE GATE.
APPLICATION FILED MAR. 8, 1912.
1,075,233.   Patented Oct. 7, 1913.
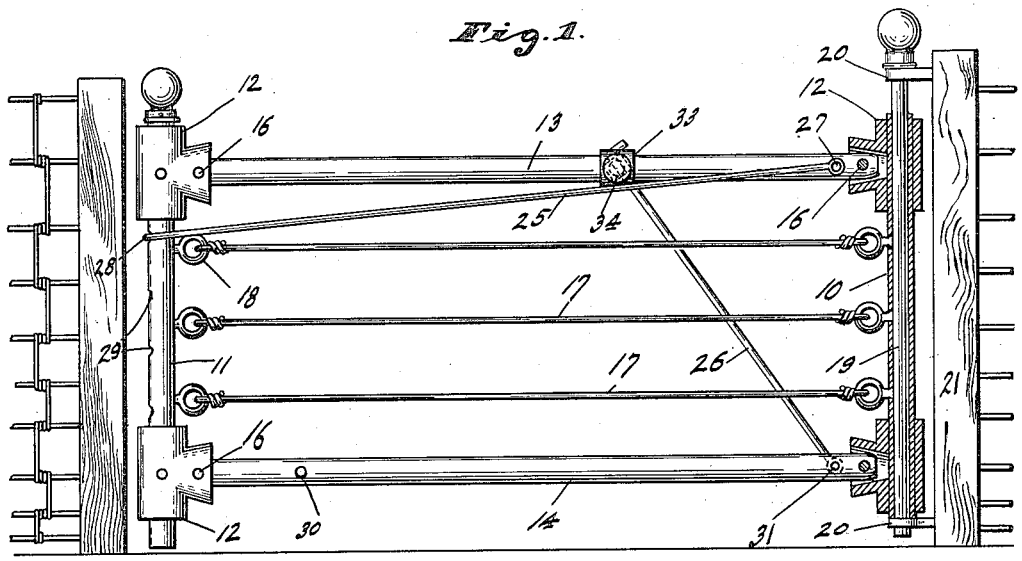
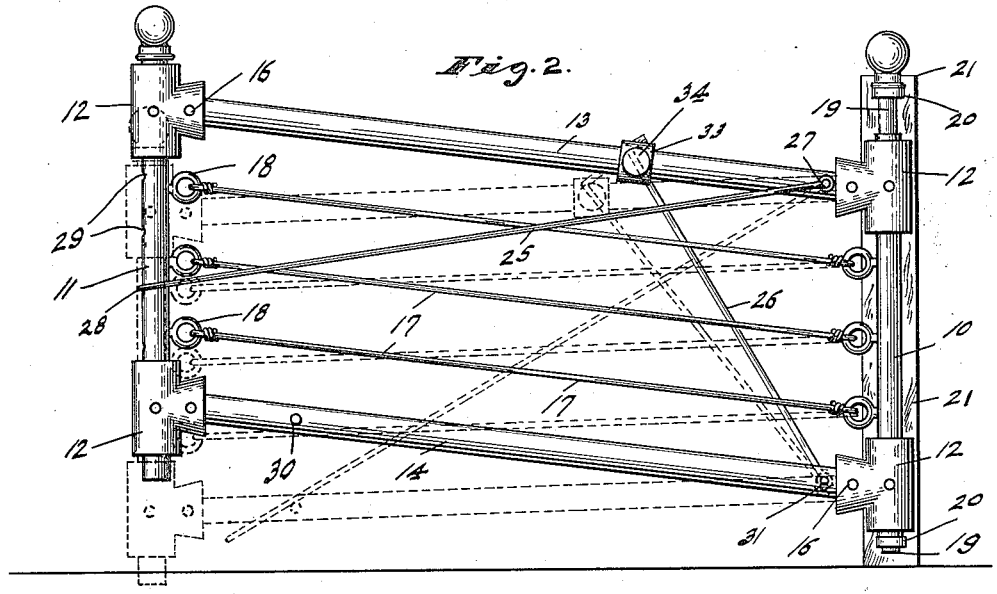
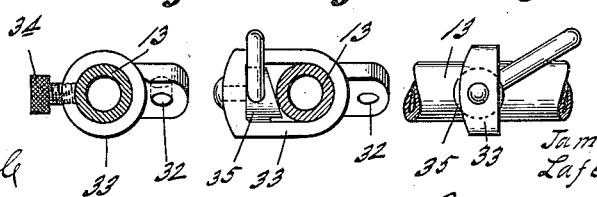
Witnesses
Frank A. Fahle
May Layden
Inventor
James E. Van Deventer,
Lafe Swank,
By Arthur M. Hood
Attorney
COLUMBIA PLANOGRAPH CO., WASHINGTON, D. C.

UNITED STATES PATENT OFFICE.

JAMES E. VAN DEVENTER AND LAFE SWANK, OF ANDERSON, INDIANA, ASSIGNORS TO DWIGGINS WIRE FENCE COMPANY, OF ANDERSON, INDIANA, A CORPORATION OF INDIANA.

ADJUSTABLE GATE.

1,075,233.

Specification of Letters Patent. Patented Oct. 7, 1913.

Application filed March 8, 1912. Serial No. 682,465.

*To all whom it may concern:*

Be it known that we, JAMES E. VAN DEVENTER and LAFE SWANK, citizens of the United States, residing at Anderson, in the county of Madison and State of Indiana, have invented a new and useful Adjustable Gate, of which the following is a specification.

It is the object of our invention to provide a stock-tight, adjustable, self-propping gate, which is at once sightly in appearance, inexpensive to manufacture, and both easy and sure in operation and adjustment.

The various novel features of our invention will appear from the description and drawings, and will be particularly pointed out in the claims.

In the drawings, Figure 1 is an elevation showing in closed position a gate embodying our invention; Fig. 2 an elevation showing the gate open and differently adjusted; Fig. 3 a detail of the locking device; and Figs. 4 and 5 details of a modified form of locking device.

The two vertical members 10 and 11, both conveniently of tubular form, are each provided near both top and bottom with a T-shaped fitting 12, riveted or otherwise fastened in place. The ends of tubes or rods 13 and 14 project loosely into the stems of the upper and lower fittings 12, and are pivotally attached therein by pins 16, thus connecting the two vertical members 10 and 11. A number of wires 17, extending parallel to the bars 13 and 14, may also connect the two vertical members, as by being fastened to eyes 18 in said members. A pin 19 passes through the tubular opening in the member 10, and is supported in eye brackets 20 suitably fastened to the gate post 21, thus furnishing a pivoted support for the gate.

The pivotal attachment of the tubes 13 and 14 to the vertical members 10 and 11 permits the member 11 to be raised and lowered rotatively to the member 10. To hold the member 11 in any desired position, two oppositely oblique but adjustable tension rods 25 and 26 are provided. By means of this obliqueness, these two tension rods, when set, prevent the vertical member 11 of the gate from being raised and lowered respectively.

As shown, the upper end of the rod 25 is pivotally mounted at 27 on the tube 13 near its vertical member 10, and is provided at its other end with a hook 28 which may engage any one of a series of holes 29 in the side of the vertical member 11, opposite the member 10. The member 11 is held at a height determined by the hole 29 which is engaged by the hook 28. By disengaging the hook 28 from all the holes, and letting the rod 25 rest, if desired, on a pin 30 in the tube 14, the member 11 may be dropped into engagement with the ground, as shown in dotted lines in Fig. 2. This holds the gate from swinging, and makes it self-propping.

The lower end of the rod 26 is pivoted at 31 to the tubes 14 near the vertical member 10. Its other end extends through a hole 32 in a lug on a fitting 33 slidably mounted on the tube 13, and is bent at an angle beyond said lug so that it cannot be withdrawn. The fitting 33 may be clamped in any position on the tube 13, as by a screw 34, as shown in Fig. 3, or by a wedge 35, which is most conveniently rotatable, as shown in Figs. 4 and 5. After the hook 28 has been inserted in the desired hole 29, the fitting 33 is moved along the tube 13 as far as the bent end of the rod 26 will permit, and is clamped there by the screw 34 or the wedge 35. The tension rod 26 now prevents the member 11 of the gate from being raised, while the tension rod 25 prevents it from being lowered. The adjustment is sure, and at the same time is easy to change. When the gate is closed it is absolutely stock-tight, for an animal cannot raise the free end of the gate by nosing under the tube 14 and lifting.

Our invention is not limited to the precise detail shown, and we aim to cover all modifications which come within the spirit and scope of the invention, as set forth in the following claims.

What we claim as new is:

1. A gate comprising the combination with two upright members, two transverse members each pivotally connected to said upright members, one of the aforesaid members being provided with a series of holes, and a pivotal support of an oblique tension rod pivotally connected at one end with one of said members and provided at the other end with a hook which may be made to engage any of said holes, and an oppositely oblique tension rod pivoted to one of said members and adjustably attached to another of said members, one end of the first tension rod being nearer both the pivotal support and the upper transverse member than is the other.

2. A gate comprising the combination with two upright members, two transverse members each pivotally connected to said upright members, and a pivotal support, of two oppositely oblique tension rods each pivotally connected at one end to one of the aforesaid members and adjustably connected at the other end to another of said members, the adjustable connection of that one of the tension members having its higher end nearer the pivotal support than its lower end being by a hook which engages the coöperating member non-slidably.

In witness whereof, we have hereunto set our hands and seals at Anderson, Indiana, this 5th day of March, A. D. one thousand nine hundred and twelve.

JAMES E. VAN DEVENTER. [L. S.]
LAFE SWANK. [L. S.]

Witnesses:
M. F. CHENEY,
J. E. DAVIS.

---

Copies of this patent may be obtained for five cents each, by addressing the "Commissioner of Patents, Washington, D. C."